Nov. 2, 1965 J. H. SUNUNU ETAL 3,215,194

HEAT SINK AND METHOD OF OPERATING THE SAME

Filed Aug. 13, 1963

INVENTOR.

JOHN H. SUNUNU
LEONHARD KATZ

BY Rines and Rines

ATTORNEYS 3,215,194
Patented Nov. 2, 1965

3,215,194

HEAT SINK AND METHOD OF OPERATING THE SAME

John H. Sununu, Concord, and Leonhard Katz, Woburn, Mass., assignors to Astro-Dynamics, Inc., Burlington, Mass., a corporation of Massachusetts Filed Aug. 13, 1963, Ser. No. 301,745
3 Claims. (Cl. 165—80)

The present invention relates to a heat sink and, more particularly, to a heat sink for use with a semi-conductor device and the like having a maximum safe temperature of operation and which may be subjected to periods of short-time overload that would ordinarily cause the device to exceed the said maximum safe temperature.

In the usual heat sink for semi-conductor devices, resistors or the like, it is customary to design the heat sink to maintain the device below a maximum safe temperature for steady state or maximum recorded operating conditions. The semi-conductor device fails quickly if the maximum safe temperature is exceeded. In those applications where the semi-conductor is driven at overload values, even for a short period of time, it has accordingly been necessary to employ larger heat sinks than would be required adequately to dissipate heat for maximum steady-state operation.

An object of the present invention, however, is to provide a novel heat sink that is not greatly larger than would be required for use with a device operated at or below its maximum safe operating temperature, but which is, nevertheless, able to remove sufficient heat from the said device during periods of short-time overload to maintain the same below its maximum safe operating temperature.

A further object is to provide such a heat sink and method of operating the same that is particularly useful in connection with semi-conductors and the like, though also of more general utility.

Other objects will be evident in the description to follow and will be particularly pointed out in the appended claims.

In summary, the objects of the invention are generally attained in a heat sink comprising a heat dissipator which may include a plurality of fins or other radiators. A container is disposed in thermal contact with the heat dissipator and contains therein a high heat-of-fusion material that changes from, for example, a solid to a liquid state at its change-of-state temperature. During the period that such a change of state is taking place, the high heat-of-fusion material absorbs a large amount of heat at substantially constant temperature in changing state, thus protecting the device being heat-dissipated by the heat sink through effectively maintaining the heat sink at substantially constant temperature. Preferred details are hereinafter set forth.

Figure 1:
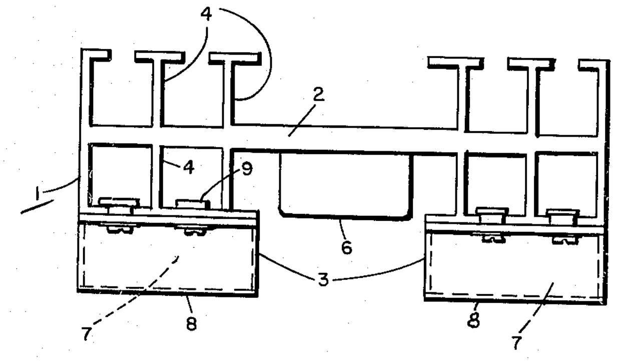
Figure 2:
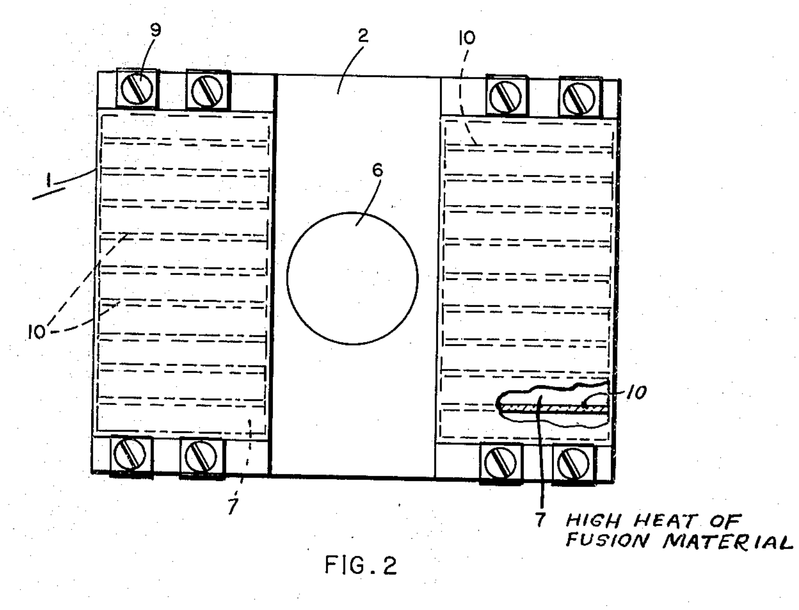

The invention will now be described in connection with the accompanying drawing in which FIG. 1 is a top view of a heat sink embodying the present invention; and FIG. 2 is an elevation view, partially broken away, of the heat sink of FIG. 1.

Referring to the drawing, a heat dissipating structure 1 is shown having a heat-conductive plate 2 from the end portions of which a plurality of T- and L-shaped heat-radiating fins 4 extend substantially vertically upward and downward. The plate is preferably of slightly decreasing thickness toward the ends, as shown, to provide a more matched feed of heat to the outer fins. The semi-conductor or other device 6 that is to be heat-dissipated is shown secured at a first region or thicker portion of the plate 2. The plate member 2 has a plurality of spaced fin radiators 4 transverse to said plate at other regions thereof remote from said first region that act to dissipate heat generated by the semi-conductor or other device 6, and are designed, in the usual application, adequately to dissipate heat generated at the maximum rating recommended by the manufacturer of the device for safe operation.

As before stated, however, there are times when the semi-conductor or other device 6 is operated at an overload for a limited period of time. In the apparatus of the present invention, the heat generated by such short-time overloads is absorbed by the changing of the state of a material 7 of high heat-of-fusion, carried in a container 8 which thermally contacts the lower heat fins 4 at the free end terminal portions thereof, as by being welded thereto or by bolts 9. Suitable materials 7 include wax-like masses of stearic and/or oleic acid or similar substances, preferably matched to have a change-of-state temperature slightly less than the maximum safe operating temperature of the semi-conductor or other device 6, as later explained. The heat-of-fusion material 7 absorbs heat during its change of state, which may be, for example, from a solid state to a liquid state in the case of the above illustrations, with the temperature of the material 7 remaining substantially constant during such change of state, thereby maintaining the said free end terminal portions below the said safe operating temperature.

Generally, high heat-of-fusion materials that may be used in connection with the present invention are very poor conductors of heat; so that it has been found in some instances to be necessary to have heat-conducting elements 10, such as of aluminum foil, embedded within or otherwise in contact with the inner portions of the said material 7 and connected in heat-transfer relation to the inner portion of the container 8 to conduct heat from the container 8 (and fins 4) to the material 7, and vice versa.

In tests with structures of the construction shown in the drawing, operated in accordance with the method underlying the invention and employing a stearic acid medium 7 as the heat-of-fusion material, the change-of-state temperature was about 60° C. depending on the purity of the stearic acid, which temperature is very close to or substantially the maximum safe operating case temperature of several types of semi-conductor and related devices.

It has also been found, as previously stated, that oleic acids are very useful in this connection because different oleic acids have somewhat different change-of-state temperatures, and mixing may be effected to obtain a desired predetermined temperature at which the change of state will take place. Both the stearic and the oleic acids and similar materials, moreover, are high heat-of-fusion materials and are not subject to superheating or supercooling during the change of state. Stearic acid, for example, absorbs about 85 B.t.u. per pound when changing from the solid to liquid state.

Further modifications of the invention herein described will occur to those skilled in the art and all such are considered to be within the spirit and scope of the present invention as defined in the appended claims.

What is claimed is:

1. A heat dissipating structure for use in connection with a heat-generating semi-conductor device and the like having a predetermined maximum safe operating temperature, said structure comprising, in combination, a heat-conductive plate adapted for mounting the device at a first region thereof, said plate having a plurality of spaced fin radiators transverse to said plate at other regions thereof remote from said first region, heat from the said device being conducted along the plate to the fin radiators, the said fin radiators being exposed to the surrounding atmosphere whereby said heat is dissipated by said fin radiators to said atmosphere, container means, a high heat-of-fusion material disposed within the container means and having a change of state temperature which is slightly below the said maximum safe temperature, the said container means being secured to the free end terminal portions of at least some of the said radiators to maintain the said portions below the said safe operating temperature.

2. A heat dissipating structure as claimed in claim 1 and in which a plurality of heat conductive members is disposed within the container means in thermal contact therewith and extending into the heat-of-fusion material to transmit heat therefrom to the container means.

3. A heat dissipating structure as claimed in claim 1 and in which the heat-of-fusion material is selected from the group consisting of stearic and oleic acids.

References Cited by the Examiner

UNITED STATES PATENTS

| | | | |
|---|---|---|---|
| 2,191,198 | 2/40 | Gould. | |
| 2,825,034 | 2/58 | Birchard | 165—185 X |
| 2,829,271 | 4/58 | Boucher | 165—80 X |
| 2,984,774 | 5/61 | Race | 317—234 |
| 3,143,592 | 8/64 | August | 165—105 |
| 3,148,676 | 9/64 | Truog et al. | |

FOREIGN PATENTS

| | | |
|---|---|---|
| 804,297 | 11/58 | Great Britain. |

ROBERT A. O'LEARY, *Primary Examiner.*

CHARLES SUKALO, *Examiner.*